(12) United States Patent
Le Grand

(10) Patent No.: US 9,459,104 B2
(45) Date of Patent: Oct. 4, 2016

(54) SYSTEMS AND METHODS FOR PERFORMING A MULTI-STEP PROCESS FOR MAP GENERATION OR DEVICE LOCALIZING

(71) Applicant: Google Inc., Mountain View, CA (US)

(72) Inventor: Etienne Le Grand, Mountain View, CA (US)

(73) Assignee: Google Inc., Mountain View, CA (US)

( * ) Notice: Subject to any disclaimer, the term of this patent is extended or adjusted under 35 U.S.C. 154(b) by 106 days.

(21) Appl. No.: 14/444,072

(22) Filed: Jul. 28, 2014

(65) Prior Publication Data

US 2016/0025498 A1 Jan. 28, 2016

(51) Int. Cl.
*G01C 21/00* (2006.01)
*G01C 21/12* (2006.01)

(52) U.S. Cl.
CPC ..................................... *G01C 21/12* (2013.01)

(58) Field of Classification Search
CPC ....... G01C 21/12; G01C 21/28; G01S 17/06; G01S 19/42; G01S 19/258; G01S 19/30; G01S 19/29
USPC ......... 701/469, 494, 495; 700/253; 709/204; 455/456.3
See application file for complete search history.

(56) References Cited

U.S. PATENT DOCUMENTS

| | | | | |
|---|---|---|---|---|
| 8,195,122 | B1 * | 6/2012 | Kahn | H04W 48/16 455/404.2 |
| 2008/0033645 | A1 * | 2/2008 | Levinson | G01C 15/00 701/469 |
| 2013/0138246 | A1 * | 5/2013 | Gutmann | G05D 1/0231 700/253 |
| 2013/0238700 | A1 * | 9/2013 | Papakipos | G06F 21/81 709/204 |
| 2013/0317944 | A1 * | 11/2013 | Huang | G01S 5/0252 705/26.61 |
| 2013/0331119 | A1 * | 12/2013 | Vaccari | H04W 4/02 455/456.1 |
| 2014/0031980 | A1 * | 1/2014 | Gutmann | G05D 1/0231 700/253 |

FOREIGN PATENT DOCUMENTS

WO W02012/106075 8/2012
WO WO 2013/071190 5/2013

* cited by examiner

*Primary Examiner* — Shardul Patel
(74) *Attorney, Agent, or Firm* — McDonnell Boehnen Hulbert & Berghoff LLP

(57) ABSTRACT

Examples describe systems and methods for performing a multi-step approach for map generation and device localizing using data collected by the device and observations of interdependencies between the data. An example method includes receiving logs of data collected by the device, determining a constraint for locations of the device according to a comparison of data in the logs of data with available known signal strength maps of corresponding data, and performing a first simultaneous localization and mapping (SLAM) optimization of location estimates of the device using the logs of data and the constraint as a first initialization. A second SLAM optimization is performed using outputs of the first SLAM optimization and relative estimates of the device based on dead reckoning as a second initialization. An output location estimate of the device is provided based on the second SLAM optimization.

18 Claims, 8 Drawing Sheets

SYSTEMS AND METHODS FOR PERFORMING A MULTI-STEP PROCESS FOR MAP GENERATION OR DEVICE LOCALIZING

BACKGROUND

Unless otherwise indicated herein, the materials described in this section are not prior art to the claims in this application and are not admitted to be prior art by inclusion in this section.

A location of a computing device can be determined using many different techniques including based either on Global Positioning System (GPS) data or on data associated with a wireless access point, such as a cellular base station or an 802.11 access point. For example, a mobile computing device may receive a GPS signal and responsively determine its position on the face of the Earth (e.g. an absolute location). In a different example, a mobile computing device may receive a signal from either a cellular base station or an 802.11 access point. The cellular base station or an 802.11 access point may estimate an exact location. Based on the location of either the cellular base station or an 802.11 access point, the mobile computing device can calculate its exact position.

Within some instances, a localization of a mobile computing device may occur via use of data from multiple different networks. Many location based services can be provided to a mobile computing device based on determining the location of the mobile computing device.

SUMMARY

In one example, a method is provided that comprises receiving logs of data, and respective data is collected by a device over a plurality of locations and over a time period. The method also includes determining first location estimates of the device according to a comparison of data available in the logs of data with available known signal strength maps of corresponding data. The first location estimates indicate a trajectory of the device over the time period. The method also includes determining, by one or more processors, second location estimates of the device using the first location estimates and relative position estimates of the device based on dead reckoning, and the second location estimates indicate a refined trajectory of the device over the time period. The method further includes determining output location estimates of the device using the second location estimates, the relative position estimates of the device based on dead reckoning, and the respective data, and the output location estimates indicate a further refined trajectory of the device over the time period.

In another example, a computer readable memory having stored therein instructions, that when executed by one or more processors, cause the one or more processors to perform functions is provided. The functions comprise receiving logs of data, and respective data is collected by a device over a plurality of locations and over a time period. The functions also include determining a constraint for locations of the device according to a comparison of data available in the logs of data with available known signal strength maps of corresponding data, and performing a first simultaneous localization and mapping (SLAM) optimization of location estimates of the device using the logs of data and the constraint as a first initialization. The functions also include based on the first SLAM optimization, providing a first location estimate of the device over the time period, and the first location estimate indicates a trajectory of the device over the time period. The functions also include performing a second SLAM optimization of the location estimates of the device using the first location estimate and relative position estimates of the device based on dead reckoning as a second initialization, and based on the second SLAM optimization, providing an output location estimate of the device over the time period.

In still another example, a system is provided that comprises one or more processors, and data storage configured to store instructions that, when executed by the one or more processors, cause the system to perform functions. The functions comprise receiving logs of data, and respective data is collected by a device over a plurality of locations and over a time period. The functions also comprise determining a constraint for locations of the device according to a comparison of data available in the logs of data with available known signal strength maps of corresponding data, and performing a first simultaneous localization and mapping (SLAM) optimization of location estimates of the device using the logs of data and the constraint as a first initialization. The functions also comprise based on the first SLAM optimization, providing a first location estimate of the device over the time period, and the first location estimate indicates a trajectory of the device over the time period. The functions also comprise performing a second SLAM optimization of the location estimates of the device using the first location estimate and relative position estimates of the device based on dead reckoning as a second initialization, and based on the second SLAM optimization, providing an output location estimate of the device over the time period.

In yet another example, a system is provided that comprises a means for receiving logs of data, and respective data is collected by a device over a plurality of locations and over a time period. The system also includes a means for determining a constraint for locations of the device according to a comparison of data available in the logs of data with available known signal strength maps of corresponding data; a means for performing a first simultaneous localization and mapping (SLAM) optimization of location estimates of the device using the logs of data and the constraint as a first initialization. The system further includes based on the first SLAM optimization, a means for providing a first location estimate of the device over the time period, and the first location estimate indicates a trajectory of the device over the time period. The system further includes a means for performing a second SLAM optimization of the location estimates of the device using the first location estimate and relative position estimates of the device based on dead reckoning as a second initialization, and based on the second SLAM optimization, a means for providing an output location estimate of the device over the time period.

These as well as other aspects, advantages, and alternatives, will become apparent to those of ordinary skill in the art by reading the following detailed description, with reference where appropriate to the accompanying figures.

DETAILED DESCRIPTION

Figure 1:
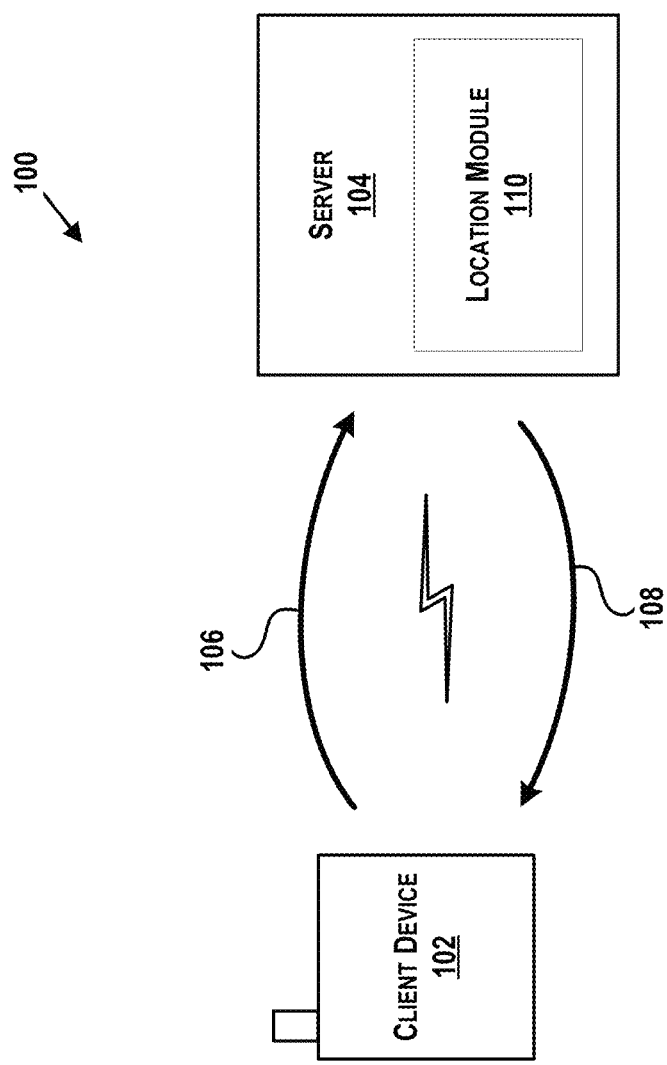
FIG. 1 illustrates an example communication system in which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

I. Overview

Within examples, a number of logs of data or traces of data are received from a number of devices. The data may include a variety of information collected by the devices including outputs of various sensors including GPS, accelerometers, gyroscopes, IMUs, barometers, magnetometers, and WiFi signal strength as just some examples. The traces of data may be processed to estimate a position of wireless access points (APs), maps of signal strength of other signals, and a position of the devices as the devices traverse a space collecting the data. Examples herein estimate a location of the traces of the devices and maps of position or signal strengths of APs or other external devices together.

Example algorithms for determining a location of a device generally rely on prior knowledge about environments, such as prior known maps of WiFi received signal strength indications (RSSI), maps of a magnetic field, geographical maps of walking paths, or maps of GPS visibility, for example. Such maps can be built by sending surveyors to geographic locations to be mapped, and the maps can also be generated and further populated using simultaneous localization and mapping (SLAM) techniques on crowd-sourced data. Using SLAM allows to scale mapping of larger areas more quickly.

Examples herein describe methods and systems for localizing a device and generating maps of areas from crowd-sourced data through use of a GraphSLAM algorithm. The crowd-sourced data includes outputs of sensors of devices indicating various parameters of where a user walked and a duration in time, for example. In one example of GraphSLAM, a trajectory of many devices and a map of an environment of the devices are simultaneously estimated using an iterative approach with a non-linear least squares fit so as to align traces of data and determine a state of maximum likelihood, or estimated location of the devices and estimated map of the environment.

A likelihood function, optimized by the non-linear least squares solver, is highly non-convex, meaning that the non-linear least squares solver is likely to converge to a local non-global maximum unless an initial state estimate is close to a global maximum likelihood state. In one example, if a trace or log of data from a device includes GPS data, which is considered reliable, an initial state estimate may be taken based on the GPS data to localize the device. If no GPS data is available, less reliable data is used, which may provide an inaccurate initial estimate, in which case it may be better to wait for an updated estimate of the environment map before using data from this trace.

Additional examples herein provide for methods and systems to increase convergence to the global optimum so as to align traces more quickly by providing a more probable initial location estimate. A GraphSLAM process (iterative or non-iterative) may include a two stage global optimum search for a global maximum likelihood state that includes first applying constraints on an absolute device position and extract synthetic convex constraints from this optimization step, and secondly using the synthetic convex constraints in a second step, while adding additional pedestrian dead reckoning constraints.

A first stage of the process may include performing a global search on a position of the device separately for each step of a user of the device where a WiFi, Bluetooth Low Energy (BLE), or other wireless network signal has been observed. The global search can be performed by a raster of all possible positions of the device (e.g., scanning from side to side in lines from top to bottom), and selecting a most likely position based on the BLE and WiFi measurements and corresponding maps that have been created or are available from other traces that have GPS data or from previous iterations of the algorithm. Any prior known maps with reliable data may be used.

The global search can be fast because the search is over a space of a low dimension (e.g., two dimensions). In one example, an N global-search of dimension two can be performed instead of performing one global search of dimension 2*n in the case of other example global search algorithms. When the search space is discretized with each dimension having ten possible values, for example, the global search corresponds to a complexity of O(n*100) instead of O(100^n). Thus, the global search is linear in time versus exponential in the number of user steps. Note that this step is optional, such as in the cases where sub-problems (considering one device position at a time, without using dead reckoning) is already convex. A global search may be provided to ensure finding a global minimum rather than a local minimum, for example.

An estimate of a position of the device may then be computed (e.g., mean and covariance) based on WiFi and BLE signals as described above, using GraphSLAM with the global-search result as initialization (e.g., a most likely position based on BLE and WiFi measurements used as the initialization), and without using pedestrian dead reckoning. The estimate of the position of the device may then be represented as synthetic convex constraints including means and covariances.

An output of the first stage is thus intermediate constraints that provide a focused search area to localize the device, or that lower a search space for the device. An example constraint may indicate that based on observation of a WiFi signal from an access point (AP), by comparison to the known prior maps of signal strength of the AP, an estimate of a search area can be provided that the device was within an area of a designated radius so as to observe the WiFi signal strength reading.

A second stage of the process may then be performed that includes replacing the WiFi and BLE constraints in the first stage by the output of the first stage (e.g., synthetic convex constraints), and pedestrian dead reckoning constraints can also be added. A new iteration can then be performed when using the iterative GraphSLAM process.

Adding the pedestrian dead reckoning constraints links data points to each other, and also links designated areas to each other. The GraphSLAM process is performed to determine an estimated trace for a global optimum. The global optimum was determined using the synthetic constraints that enabled fast convergence, and reduces a risk of ending up in a local non-global optimum.

A resulting state estimate can then be further refined with additional iterations of GraphSLAM, using pedestrian dead reckoning constraints, and removing the synthetic convex constraints and replacing the synthetic convex constraints with the raw WiFi and BLE constraints, for example, to provide an output using the raw data.

Example methods may be performed from data received from one device over time, or from data received from many devices over time. The method may be performed in parallel as data is received.

II. Example Systems and Devices

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, or tablet computing device, etc., that is configured to transmit data 106 to or receive data 108 from the server 104 in accordance with the method and functions described herein. The client device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the methods and computing device functions described herein. Further, the server 104 may be configured to send data 108 to or receive data 106 from the client device 102. The server 104 may include a location module 110 which may be configured to process the data 106 received from the client device 102 to determine a locations (present and historical) associated with the client device 102.

The data 106 received by the server 104 from the client device 102 may take various forms. For example, the client device 102 may provide information indicative of a location of the client device 102, movement of the client device 102, or inputs from a user of the client device 102. The server 104 may then process the data 106 to identify a location history that matches to the received data.

The data 108 sent to the client device 102 from the server 104 may take various forms. For example, the server 104 may send to the client device 102 an indication of location, updated location history information, or information based on the locations of the device.

Figure 2:
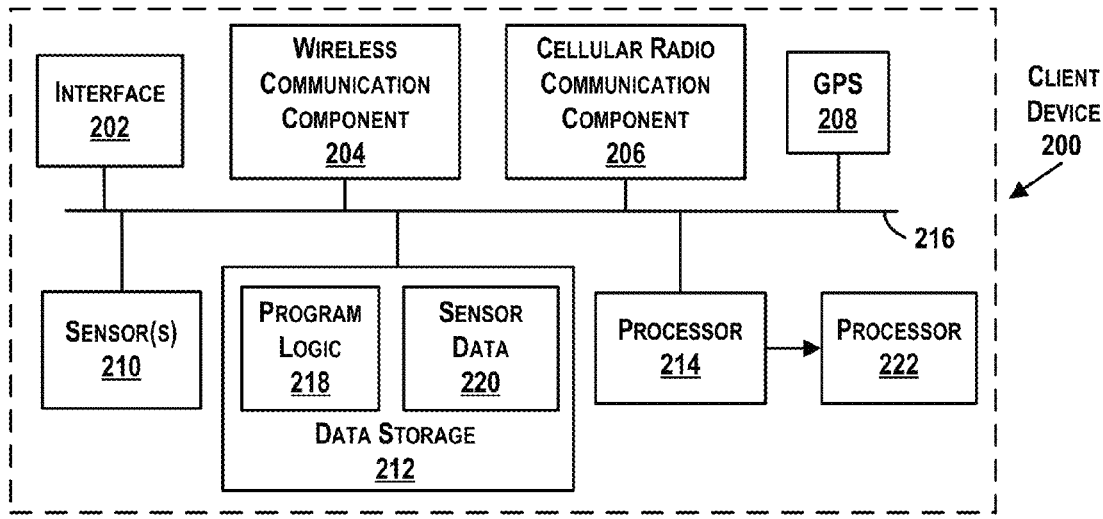
FIG. 2 illustrates a schematic drawing of an example device.

FIG. 2 illustrates a schematic drawing of an example device 200. In FIG. 2, the computing device takes a form of a client device 200. In some examples, some components illustrated in FIG. 2 may be distributed across multiple computing devices. However, for the sake of example, the components are shown and described as part of one example client device 200. The client device 200 may be or include a mobile device, desktop computer, email/messaging device, tablet computer, or similar device that may be configured to perform the functions described herein.

In some implementations, the client device 200 may include a device platform (not shown), which may be configured as a multi-layered Linux platform. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, sensor(s) 210, data storage 212, and a processor 214. Components illustrated in FIG. 2 may be linked together by a communication link 216. The client device 200 may also include hardware to enable communication within the client device 200 and between the client device 200 and another computing device (not shown), such as a server entity. The hardware may include transmitters, receivers, and antennas, for example.

The interface 202 may be configured to allow the client device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The processor 214 may be configured to determine one or more geographical location estimates of the client device 200 using one or more location-determination components, such as the wireless communication component 204, the cellular radio communication component 206, or the GPS 208. For instance, the processor 214 may use a location-determination algorithm to determine a location of the client device 200 based on a presence and/or location of one or more known wireless access points within a wireless range of the client device 200. In one example, the wireless communication component 204 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, signal from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the client device 200.

In still another instance, the processor 214 may use a location-determination algorithm to determine a location of the client device 200 based on signals sent by GPS satellites above the Earth. For example, the GPS 208 may be configured to estimate a location of the mobile device by precisely timing signals sent by the GPS satellites.

In some examples, the processor 214 may use a location-determination algorithm that combines location estimates determined by multiple location-determination components, such as a combination of the wireless communication component 204, the cellular radio component 206, and the GPS 208.

The sensor 210 may include one or more sensors, or may represent one or more sensors included within the client device 200. Example sensors include an accelerometer, gyroscope, pedometer, light sensors, microphone, camera, or other location and/or context-aware sensors.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The client device 200 is illustrated to include an additional processor 222. The processor 222 may be configured to control other aspects of the client device 200 including displays or outputs of the client device 200 (e.g., the processor 222 may be a GPU). Example methods described herein may be performed individually by components of the client device 200, or in combination by one or all of the components of the client device 200. In one instance, portions of the client device 200 may process data and provide an output internally in the client device 200 to the processor 222, for example. In other instances, portions of the client device 200 may process data and provide outputs externally to other computing devices.

Figure 3:
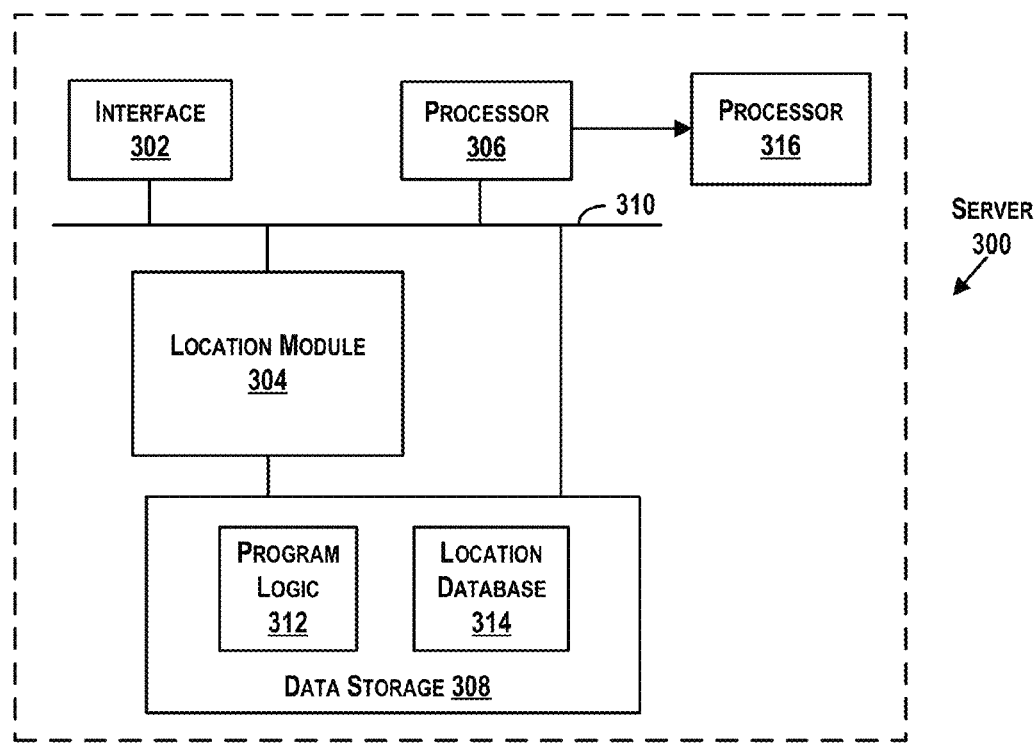
FIG. 3 illustrates a schematic drawing of another example computing device.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, a location module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and determine a geographic location of the client device. The determination may be based on outputs of an accelerometer, gyroscope, or other sensors of the client device, as well as based on location determinations of the client device. The location module 304 may further be configured to determine and store a history of sensor measurements of the client device for later reprocessing based on updated data pertaining to networks or information used to the determine the locations.

The data storage 308 may store program logic 312 that can be accessed and executed by the processor 306. The data storage 310 may also include a location database 314 that can be accessed by the processor 306 as well, for example, to retrieve information regarding wireless access points, locations of satellites in a GPS network, floor plans of a building, etc., or any other type of information useful for determining a location of a client device.

The server is illustrated with a second processor 316 which may be an application specific processor for input/output functionality. In other examples, functions of the processor 306 and the processor 316 may be combined into one component.

Within examples, measurements collected from various sensors of a device (such as WiFi components, GPS sensors, and inertial sensors) can be combined with information from external databases (such as known locations of WiFi access points or building floor plans) to estimate a location or movement of the device in real-time. Recording the real-time location estimate at all times (or intervals/increments of time) may also produce a location history.

III. Example Methods and Functionality

Figure 4:
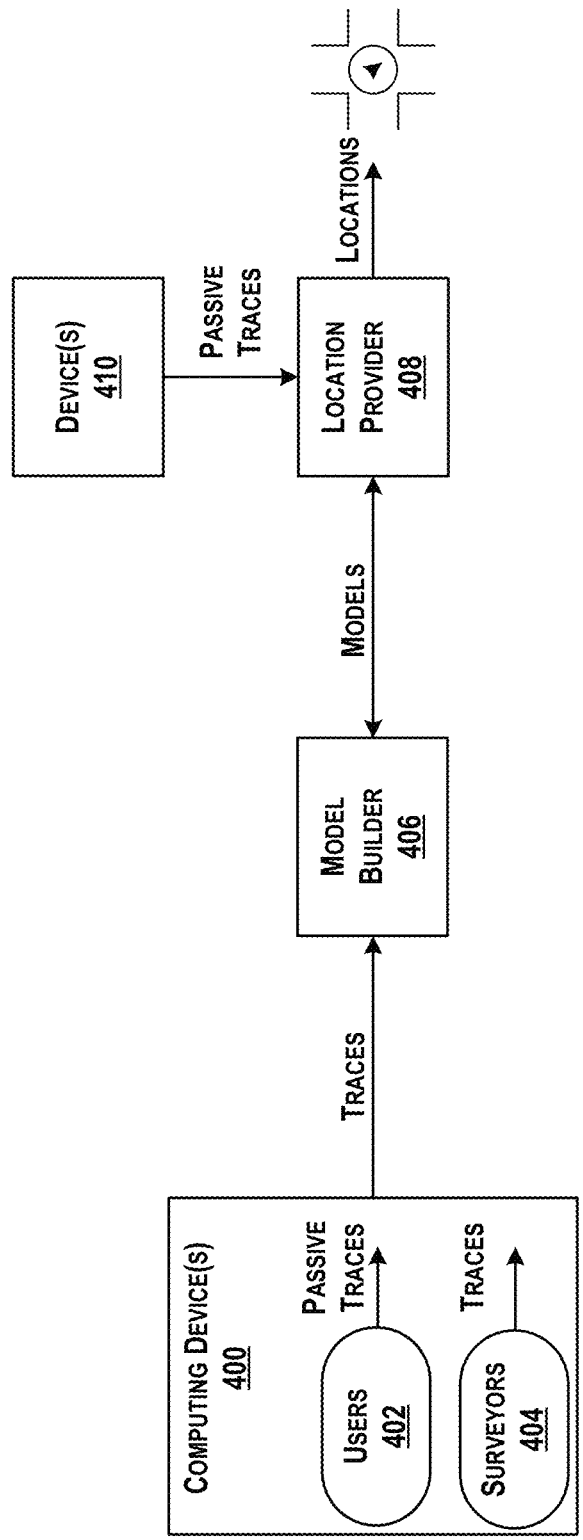
FIG. 4 is a flow diagram illustrating an example method for determining a location or movement of a device.

FIG. 4 is a flow diagram illustrating an example method for determining a location or movement of a device. Initially, computing device(s) 400, operated by users 402 or surveyors 404, may traverse areas in an environment and output traces to a model builder 406. A device operated by a user 402 may output traces passively (i.e., the device may be configured to output the trace data with no additional user input), including raw data output by sensors of the device like WiFi scans, GPS data, accelerometer data, etc. Each trace may be associated with a time the data was collected, and thus, for traces that include GPS data, other data in the traces also has location-specific references. A device operated by a surveyor 404 may have location-specific references for all traces, whether due to associated GPS data or manual input of location information.

The model builder 406 may be a module on a computing device or server, and may be configured to generate a model of the environment based on the received traces. The model builder 406 may include a trace localizer and a map builder. The model builder 406 may access reference data such as information like strength of signal (RSSI) for WiFi access points in the environment at specific locations in the environment, or other landmark data of the environment. The model builder 406 may be configured to generate a map or path of the device based on the traces. In one example, the model builder 406 may utilize GPS data to determine locations of the device over time, utilize dead reckoning (based on accelerometer and gyroscope outputs) to project a path, and optimize the path by jointly combining each. The model builder 406 may further optimize the path to match WiFi scan data to the reference WiFi maps to align a path that most likely resembles a path that the device traversed through the environment.

A location provider 408 may access a model output by the model builder 406 to determine locations of other device(s) 410 based on provided passive traces as well. Within examples, the location provider 408 may return a location of the device or an estimation of movement of the device to the device 410 based on data received in the traces.

Traces received from devices may include a variety of measurements from multiple different sensors, and may include a variety of measurements collected over time or at various locations. A trace may refer to a sensor log or a collection of data output from sensors on the device over some time period and collected over a number of locations. The sensors that output data may be selected, or data to be included within the sensor log may also be selected. In some examples, a trace of data may include all data collected by a device (using a number of sensors) over a given time frame (e.g., about 5 seconds, or perhaps about 5 minutes long or any ranges therein or longer). Measurements in a trace or from trace to trace may be considered statistically independent. However, in instances in which the measurements are collected from positions/locations in close proximity or collected close in time, the measurements may have correlations.

The traces or logs of data may be used to build a WiFi signal strength map of the number of locations aligned to latitude and longitude or position coordinates. Estimate WiFi access point (AP) positions can be made based on known locations of where the WiFi scans occurred. The reverse is also true. To solve the problem when both are initially unknown, a simultaneous localization and mapping (SLAM) can be performed to solve both at the same time using received data in the logs of data. If one of a location of a WiFi AP or locations of WiFi scans are known, then the known data can be held constant while optimizing the other. The received logs of data can be used to determine relative paths traversed by the devices using dead reckoning, which provides estimates of AP locations and trajectory of the devices relative to each other, and such relative estimates can be aligned with more absolute positions using measurements from GPS. However, GPS provides latitude and longitude measurements, but only in certain locations (mostly outdoors).

Additional or alternative maps of signals or signal strengths may also be generated based on received logs of data or accessed to localize a device. Such maps include magnetic field maps, Bluetooth device maps, or geographic walkway and street maps, for example.

Examples herein describe methods and systems for generating maps of areas from crowd-sourced data through use of a GraphSLAM algorithm. The crowd-sourced data includes outputs of sensors of devices indicating various parameters of where a user walked and a duration in time, for example. In one example, if a trace or log of data from a device includes GPS data, which is considered reliable, an initial state estimate may be taken based on the GPS data to localize the device. If no GPS data is available, less reliable data is used, which may provide an inaccurate initial estimate. Examples herein provide for methods and systems to increase convergence to the global optimum so as to align traces more quickly using a two stage global optimum search for a global maximum likelihood state. First, constraints are applied on an absolute device position, synthetic convex constraints are extracted from this optimization step, and second, the synthetic convex constraints are used in a second step while adding additional pedestrian dead reckoning constraints.

Figure 5A:
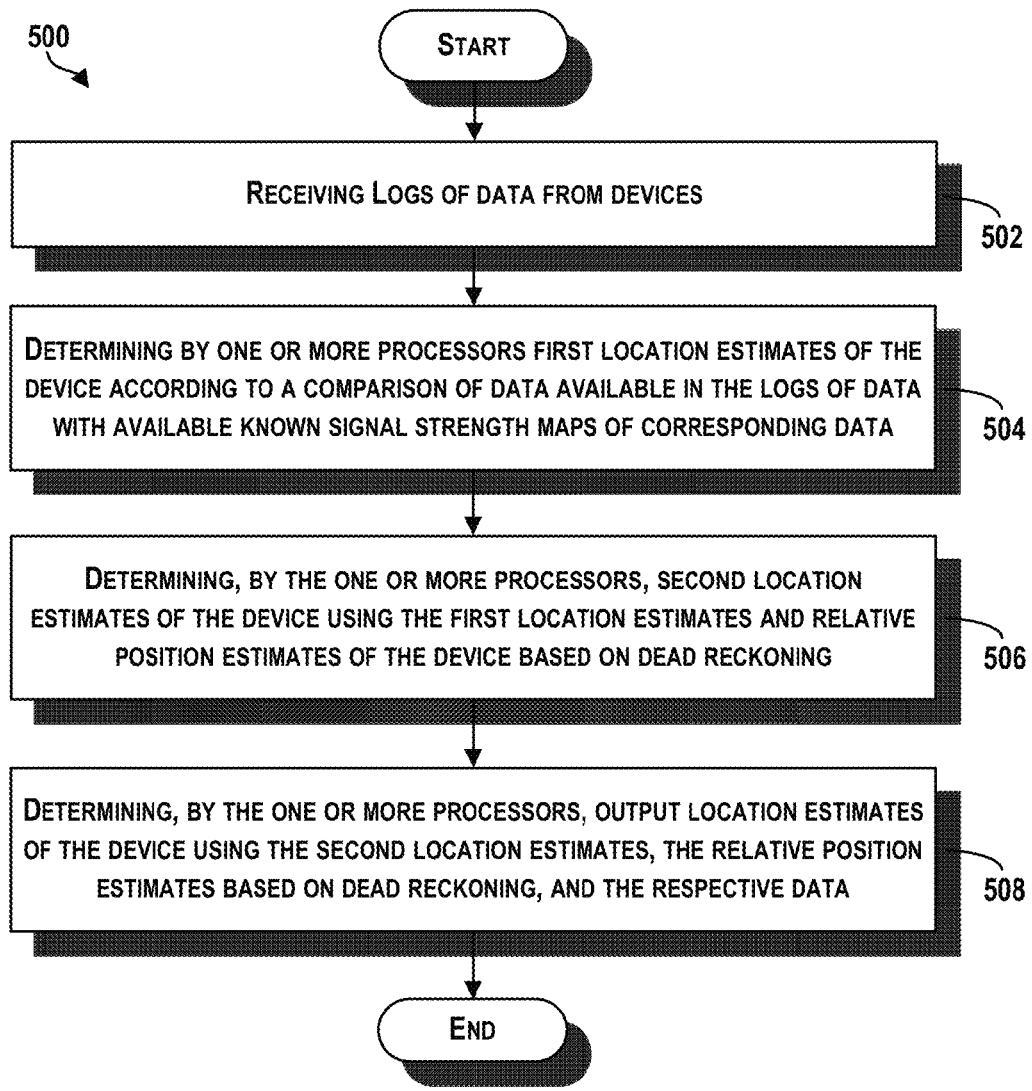
FIGS. 5A-5B are block diagrams of example methods for performing a multi-step approach for map generation and device localizing using data collected by the device and observations of interdependencies between the data, in accordance with at least some embodiments described herein.

FIG. 5A is a block diagram of an example method for performing a multi-step approach for map generation and device localizing using data collected by the device and observations of interdependencies between the data, in accordance with at least some embodiments described herein. Method 500 shown in FIG. 5A presents an embodiment of a method that, for example, could be used with the system 100 in FIG. 1, the device 200 in FIG. 2, the server 300 in FIG. 3, or the system in FIG. 4, for example, or may be performed by a combination of any components of in FIGS. 1-4. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 500 and other processes and methods disclosed herein, each block in FIG. 5A may represent circuitry that is wired to perform the specific logical functions in the process.

Functions of the method 500 may be fully performed by a computing device (or components of a computing device such as one or more processors), or may be distributed across multiple components of the computing device, across multiple computing devices, and/or across a server. In some examples, the computing device may receive information from sensors of the computing device, or where the computing device is a server the information can be received from another device that collects the information.

At block 502, the method 500 includes receiving logs of data from devices. The logs of data may include data collected by a device or sensors of the device over a plurality of locations and over a time period. An example log of data may include one or more of GPS positioning data, received signal strength indication (RSSI) for a wireless access point (AP), accelerometer data, gyroscope data, and magnetic field data collected by the device as the device traverses an area. The logs of data may be received on a continual basis, or periodically as the logs are collected. As an example, every 5 seconds, a new log of data having data collected over the 5 second time period may be received. An example log of data may be associated with a time stamp and may include GPS coordinates, WiFi scans, and accelerometer data or whatever data was collected during that time. However, logs of data may include different combinations of data, or data collected at different times. An example log of data may indicate at time t=2s, GPS output lat=23.56789, lng=67.23456; at time t=2.1s, four Wifi APs observed at recorded RSSI strengths; at time t=2.4s, a step was recorded and turned right by 10 degrees, etc.

Logs of data may be associated with geographic positions, when known (e.g., when GPS signals available). Thus, information in a log may indicate RSSI for a wireless network at a given location and at a given time period, or magnetic field data collected at a given location for a given time, etc.

At block 504, the method 500 includes determining by one or more processors first location estimates of the device according to a comparison of data available in the logs of data with available known signal strength maps of corresponding data. In one example, possible locations of the device can be determined for instances when a wireless network signal has been observed from a wireless network. In this example, the wireless network signal can be compared to a map of wireless signal strength for the wireless network, and a probability of measuring the measured signal strength at each possible device position is computed. The location estimate of the device can then be considered a location maximizing this probability, and the uncertainty associated with this estimate is derived by fitting a simple distribution function to the probability map. An example distribution to use is a multivariate Gaussian distribution, for which a mean and standard covariance are adjusted to fit the probability map, for example, by taking the maximum probability location as the mean and using the same standard deviation as the measurement probability map. More complex distributions can be used if the Gaussian distribution does not fit well to the probability map. The fitted probability distribution can, in future steps, be used as a constraint for the location of the device. In other examples, each piece of information, such as WiFi RSSI measurements, GPS measurements, BLE measurements, etc. may be used as a constraint, and when combined, can be considered an overall constraint that would correspond to overlapping likely areas of position of the device.

Figure 6:
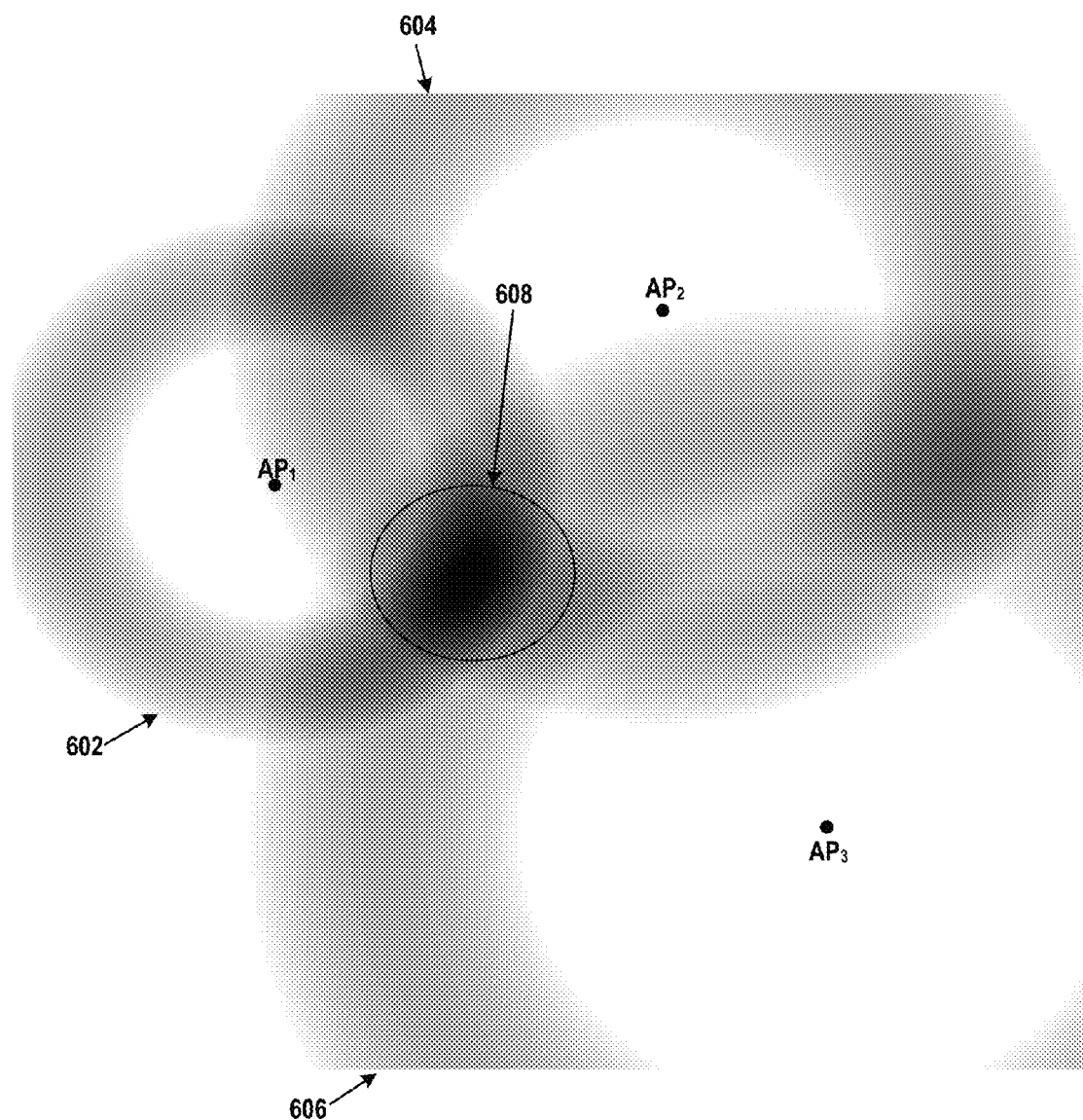
FIG. 6 illustrates conceptual measurement probability maps for multiple wireless access points (APs) in which a given wireless signal strength corresponds to a signal strength of a wireless network signal received from each AP.

FIG. 6 illustrates conceptual measurement probability maps 602, 604, and 606 for multiple wireless access points (APs) in which a given wireless signal strength corresponds to a signal strength of a wireless network signal received from each AP. FIG. 6 illustrates probability as a gradient in which darker shades correspond to a higher probability that the device is located in such areas. A darker area 608 of all three areas can be used as the constraint, and is a darkest area in this example, corresponding to a highest probability of location of the device. Thus, in instances in which the device has received a wireless signal from each of the three APs, within a given time period, it is likely that the device was within area 608 where the measurement probability is higher.

Still further, intersections of areas determined for multiple types of data can be used as well. For example, an intersection of an area of a WiFi access point with an area of a Bluetooth device can be determined to identify some geographic intersection area of the two areas. In further examples, types of areas or constraints are based on data available in the logs of data. Based on presence of a wireless network signal, a Bluetooth wireless signal, or a magnetic field signal, individual respective areas can be determined, and then a geographic intersection area of the respective areas can be identified for use as the constraint.

Figure 7:
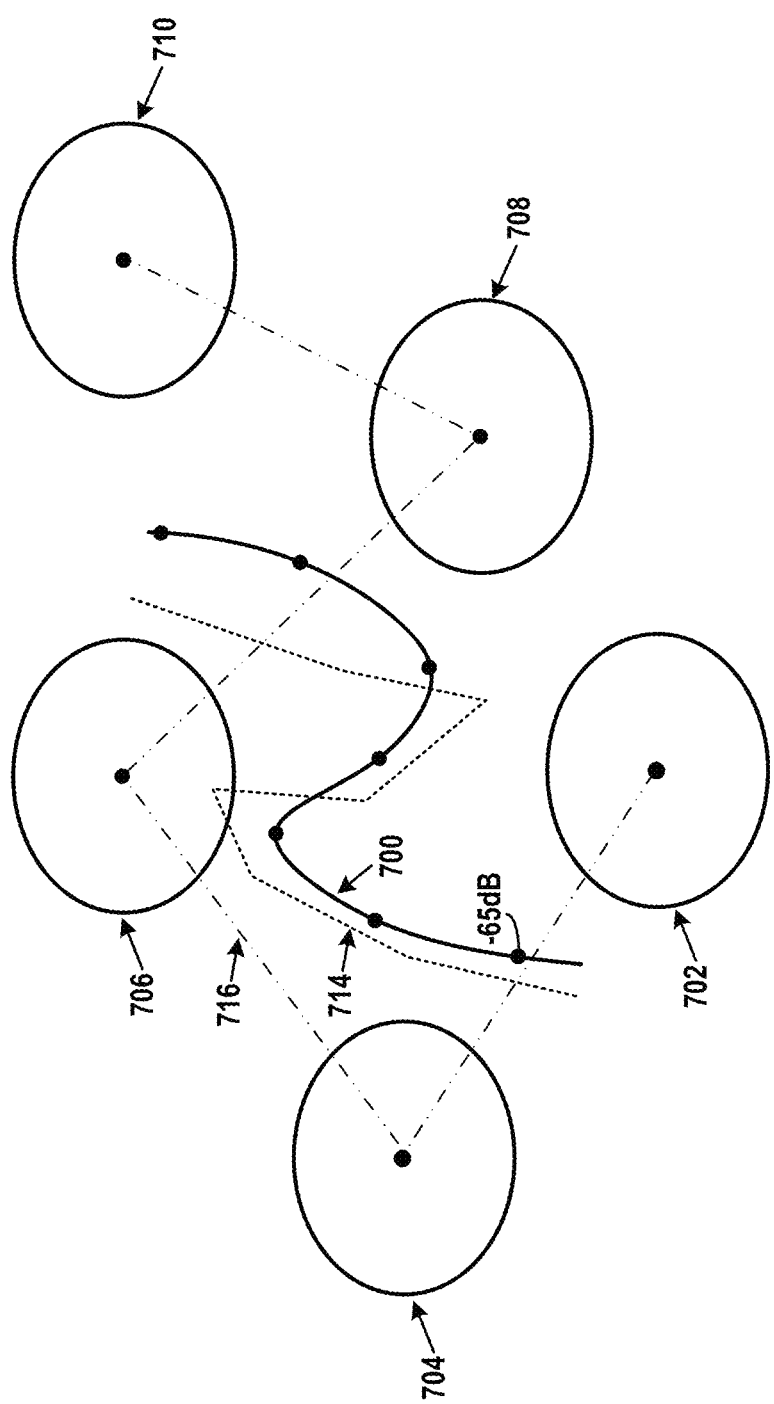
FIG. 7 illustrates an example trace of a device through an environment and conceptual signal strength maps overlaid on the environment.

FIG. 7 illustrates an example trace 700 of a device through an environment and conceptual signal strength or measurement probability maps 702 and 704 overlaid on the environment. In FIG. 7, the signal strength maps 702 and 704 may represent wireless signal strength maps for a WiFi access point. A grid of signal strengths may be known for each AP, and corresponding locations of the AP and strength of signal per location may be correlated.

Areas 706, 708, and 710 represent likely positions of the device based on constraints from the measurements and the map. These positions are position estimates with associated uncertainties that later are converted to convex constraints for further analysis.

In one example, to determine a measurement probability map in which the given wireless signal strength corresponds to the signal strength measured at a position to be estimated, a first and second radius can be determined that indicates a first and second distance away from the AP in the wireless network for which the signal strength is associated. Then, measurement probability map may be a circular region (e.g., or donut region) having a first perimeter defined by the first radius and a second perimeter defined by the second radius. The measurement probability map may not be binary; however, as a position may still be outside of the doughnut region, but the further away from the region, the less likely the position is a correct estimate. In FIG. 7, a data point is shown that includes a wireless signal strength of −65 dB, and the measurement probability map for a wireless signal related to AP 702 is shown as a circular area, and the measurement probability map for a wireless signal related to AP 704 is shown as another circular area.

In one example, in instances in which a position of the AP and/or a map of the WiFi RSSI fingerprints are known, this can provide information about how probable it is for a device position to be at different places in space. For instance, using a fingerprint map, if a measurement of AP1 was −60 db and AP2 was −70 db, then it is more likely to have been made in an area of the space where a fingerprint for AP1 is close to −60 db and a fingerprint for AP2 is close to −70 db. Further, using an RSSI fall off model, for the same measurements, the device is more likely to be, say about 5 meters from AP1 and about 10 meters from AP2 (because −60 db is usually observed ~5 meters away from APs, and −70 db about ~10 meters away). By combining all pieces of information together, a most probable position for obtaining the measurement can be made.

In other examples, possible locations of the device can be determined for instances when a Bluetooth wireless signal has been observed. The Bluetooth signal can then be compared to a map of Bluetooth devices, and a measurement probability map in which a given Bluetooth wireless signal is estimated to be received can be determined. Within examples, Bluetooth devices may include static devices (e.g., such as Bluetooth Low Energy (BLE) beacons) that emit signals to nearby devices. Each Bluetooth device will have a range in which signals can be emitted, and the range can be used as a measurement probability map as the constraint for locations of the device.

In still other examples, possible locations of the device can be determined for instances when a magnetic field signal has been collected. For example, ambient magnetic fields are present in environments, and include disturbances or as anomalies in the Earth's magnetic field caused by pillars, doors, elevators in hallways, or other objects that may be ferromagnetic in nature. A device may measure a magnetic field, and when such magnetic field measurements are present he logs of data, the measurements can be compared to a map of magnetic field signal strength for a given location, and a measurement probability map in which a given magnetic field signal strength corresponds to a signal strength of the magnetic field signal can be determined and used as the constraint.

Any number of combinations of constraints can be used as well. In an example where the logs of data include wireless signals from multiple networks, or Bluetooth signals from multiple devices, an intersection of respective areas of probability can be used. The intersection may be a multiplication of relative probabilities provided by each piece of information (or the addition of their log-likelihood).

Referring back to FIG. 5A, the first location estimates indicate a trajectory of the device over the time period. Within examples, the trajectory may describe an unbroken arc illustrative of movement of the device over time. Alternatively or additionally, the trajectory may describe multiple trajectories, or multiple paths that illustrative movement of the device over time including segments of time in which the device may be stationary, for example. The trajectory can also indicate combinations of paths over the time period or may be comprised of multiple paths and non-movement indications as well. Within examples, the first location estimates are determined using a simultaneous localization and mapping (SLAM) optimization (described more fully below).

In some examples, determining the first location estimates comprises a first stage of localizing that includes performing a global search on a position of the device separately for each step of a user of the device where a WiFi, Bluetooth Low Energy (BLE), other wireless network signal, magnetic field signal, etc. has been observed. The global search can be performed by a raster of all possible positions of the device (e.g., scanning from side to side in lines from top to bottom), and selecting a most likely position based on the BLE and WiFi measurements and corresponding maps that have been created or are available from other traces that have GPS data or from previous iterations of the algorithm. Any prior known maps with reliable data may be used. As described with reference to FIG. 7, measurement probability maps can be used to select a most likely position in the area that matches to all data collected by the device over similar time periods. When overlapping areas are present, due to multiple wireless signals or multiple signals of different types generating respective areas, a higher probability of a location estimate can be selected.

The global search can be fast because the search is over a space of a low dimension (e.g., two dimensions). In one example, an N global-search of dimension two can be performed instead of performing one global search of dimension 2*n in the case of other example global search algorithms. When the search space is discretized with each dimension having ten possible values, for example, the global search corresponds to a complexity of $O(n*100)$ instead of $O(100^n)$. Thus, the global search is linear in time versus exponential in the number of user steps.

A first estimate of a position of the device may be computed (e.g., mean and covariance) using any number of localizing algorithms with the global-search result as initialization, and without using pedestrian dead reckoning. The estimate of the position of the device may then be represented as synthetic convex constraints including means and covariances. Example localizing algorithms include SLAM or GraphSLAM.

Initially, an actual position is unknown, and thus, possible constraints are determined to reduce a search area for the position. Constraints usually point to an area of possible locations of the device, which is used as a first estimate.

An output of the first stage is thus intermediate constraints that provide a focused search area to localize the device, or that lower a search space for the device. As mentioned, an example constraint may indicate that based on observation of a WiFi signal from an access point (AP), by comparison to the known prior maps of signal strength of the AP, an estimate of a search area can be provided that the device was within an area of a designated radius so as to observe the WiFi signal strength reading.

As an example a synthetic constraint for a position of a WiFi measurement may be created by first choosing a set of position hypotheses to consider, such as positions on a rectangular grid. A uniform probability map may be known, and a probability of being at each considered position is initially equal. For each WiFi AP seen by the measurement, and at each considered position, a probability associated with the measured RSSI for each position is computed, given their distance to the AP. The probabilities given by each AP are multiplied, and a probability map for the position of the device when the WiFi measurement was made is created. A maximum of this map represents a most probable position of the device, and how quickly values degrade moving further away from this maximum represents a confidence in the estimate. A local portion of the map around the maximum can be fit to a desired distribution, such as a multi-variate Gaussian distribution. The distribution can then be used as the synthetic constraint in later optimizations. An estimated position of x=10 m, y=20 m, with 2 meters uncertainty can be represented as the synthetic constraint so that x and y are within 2 meters of (10 m, 20 m). This is one example, and other constraint values are possible as well, such as x and y following a multivariate Gaussian distribution around (10 m, 20 m), with standard deviation 2 meters.

Referring back to FIG. 5A, at block 506, the method 500 includes determining, by the one or more processors, second location estimates of the device using the first location estimates and relative position estimates of the device based on dead reckoning. The second location estimates indicate a refined trajectory of the device over the time period.

A second stage of the process may thus be performed that includes replacing the WiFi and BLE constraints in the first stage by the output of the first stage (e.g., synthetic convex constraints), and pedestrian dead reckoning constraints can also be added. A new iteration can then be performed when using the iterative GraphSLAM process, for example.

A dead reckoning constraint can be determined from accelerometer data or gyroscope data of logs of data. Dead reckoning calculations link positions of devices between two steps. A first step may be at time t, and another t+1 that is likely to be around 3 ft in front of the first, and angle of turn can be determined using, for example, gyroscope data. An example dead reckoning determination may be performed to determine an estimation of a current position of the computing device based on a previous position of the computing device, an estimated speed over an elapsed time, and a direction of travel of the computing device. Within examples, information indicating a previous position may be received from a server that calculates or determines the information due to communication with the computing device, or from sensors of the computing device including a GPS sensor. The previous position may also be derived or calculated from a number of data points such as GPS location determinations, or WiFi scans and associated WiFi mappings. The estimated speed can also be received from a server, or derived or calculated from position determinations over the elapsed time or based on other data over the elapsed time including outputs of a pedometer, for example. Using a known or estimated distance traveled (as derived or calculated from outputs of a pedometer, outputs of an accelerometer inferring a step has been taken, or other sensor data), a speed can be determined based on the elapsed time. The direction of travel of the computing device may similarly be determined from data received from a server, or from sensors on-board the computing device such as a magnetometer or compass, for example. Any available information may be used to infer a direction of travel including a fusion of accelerometer, gyroscope, and optionally magnetometer data, for example. In still other examples, other available information can be used to provide further estimates (directly or indirectly) as to direction of travel, including WiFi scans received in traces that may give information as to a position and heading of a device and/or user.

The dead reckoning calculation can then be performed to determine an estimation of the current position of the computing device. As an example, an accelerometer of the computing device can be used as a pedometer and a magnetometer as a compass heading provider. Each step of a user of the computing device causes a position to move forward a fixed distance in a direction measured by the compass. Accuracy may be limited by precision of the sensors, magnetic disturbances inside structures of the computing device, and unknown variables such as carrying position of the computing device and stride length of the user. However, the estimate of the current position can be determined in this manner.

The path based on the dead reckoning determination can be processed with the other constraints so as to provide relative paths of the devices mapped to position coordinates. Adding the pedestrian dead reckoning constraints links data points to each other, and also links designated constraint areas to each other. From information for a single step, it is difficult to localize a device. However, linking a first data point to a second data point enables aggregation of constraints. Referring to FIG. 7, dead reckoning relative position estimates may be used together with synthetic constraints to indicate a path 714, and WiFi constraints or areas may indicate a consecutive estimates of device position when determining the synthetic constraints as shown by line 716. The path 714 may be processed or refined to determine an estimation of the path of the device.

Referring back to FIG. 5A, at block 508, the method 500 includes determining, by the one or more processors, output location estimates of the device using the second location estimates, the relative position estimates of the device based on dead reckoning, and the respective data, and the output location estimates indicate a further refined trajectory of the device over the time period. A resulting state estimate can thus be further refined with additional iterations of localizing algorithms (e.g., GraphSLAM), using pedestrian dead reckoning constraints, and removing the synthetic convex constraints and replacing the synthetic convex constraints with the raw WiFi and BLE constraints, for example, to provide an output using the raw data.

As an example, an artificial probability distribution may be used to determine the areas in the map where the respective data is estimated to be collected, and by performing additional SLAM optimizations replacing the artificial probability distribution with the respective data, more accurate location results are provided. However, using the artificial constraint initially helps to improve chances for convergence to a global optimum more quickly.

In further examples, the method 500 includes generating maps of areas based on the output location estimate of the device and the logs of data. The maps include maps of WiFi received signal strength indications (RSSI), maps of magnetic fields, geographical maps of pathways, and maps of GPS visibility. In such examples, crowd-sourced data can be received, and maps can be generated, updated, and refined using the localizing methods described herein.

Thus, within examples, the method 500 may be used to develop a WiFi signal strength map based on observed RSSI by a device mapped to a most probable path taken by the device and indicated by outputs of sensor observations. If GPS was available at all time and accurate, GPS may be used to develop the map. However, all sensors may have some imprecision due to noise, and GPS may not always be available. Thus, observations from all sensors can be used.

Figure 5B:
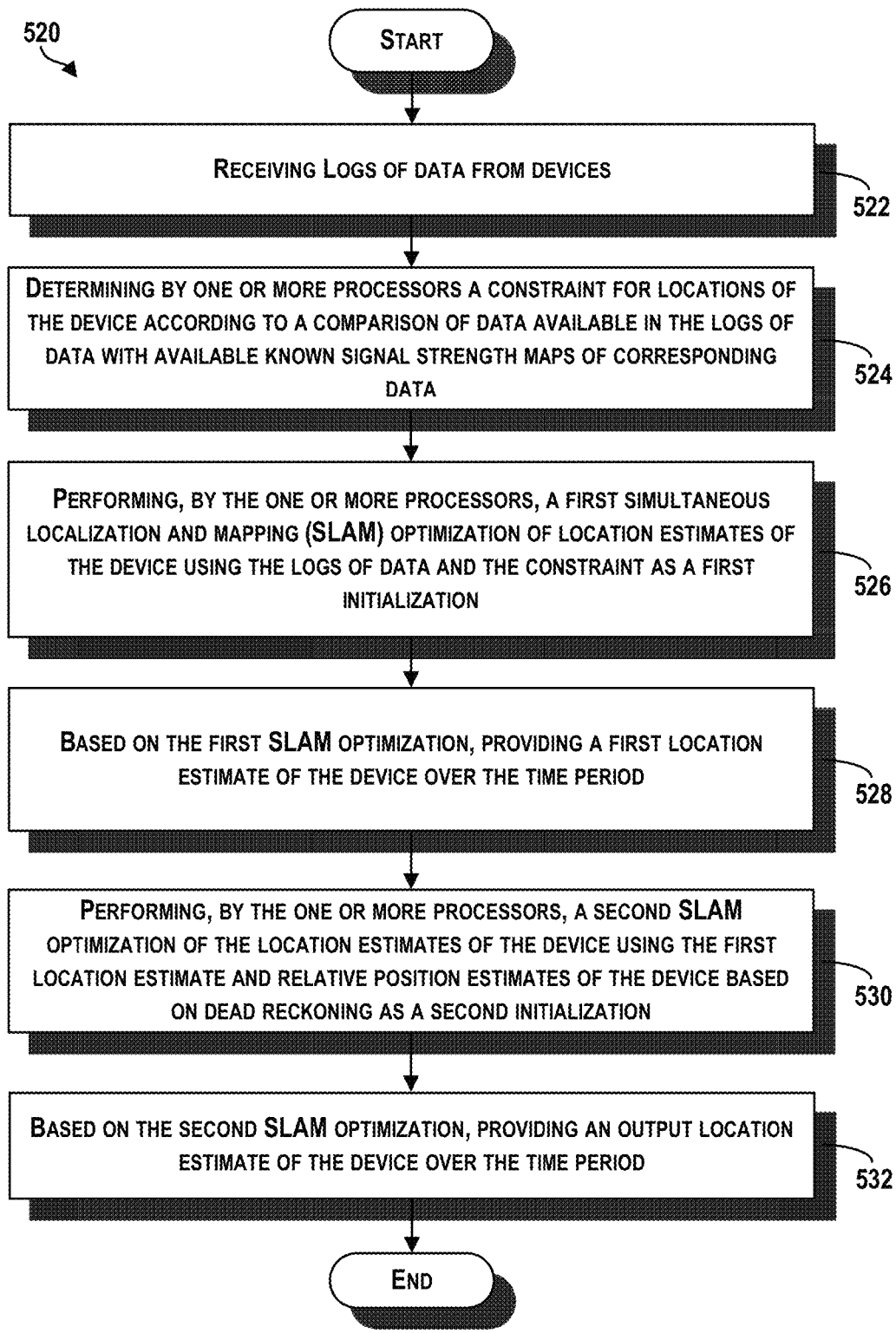

FIG. 5B is a block diagram of another example method 520 for performing a multi-step approach for map generation and device localizing using data collected by the device and observations of interdependencies between the data, in accordance with at least some embodiments described herein.

At block 522, the method 520 includes receiving logs of data, and at block 524, the method 520 includes determining a constraint for locations of the device according to a comparison of data available in the logs of data with available known signal strength maps of corresponding data. Such functions are similar to those described above in FIG. 5A.

At block 526, the method 520 includes performing a first simultaneous localization and mapping (SLAM) optimization of location estimates of the device using the logs of data and the constraint as a first initialization. At block 528, the method 520 includes based on the first SLAM optimization, providing a first location estimate of the device over the time period. Within examples, the first SLAM optimization is a first stage of the method 520 to determine initial location estimates of the device.

At block 530, the method 520 includes performing a second SLAM optimization of the location estimates of the device using the first location estimate and relative position estimates of the device based on dead reckoning as a second initialization, and at block 532, the method 520 includes based on the second SLAM optimization, providing an output location estimate of the device over the time period.

The SLAM optimization may include performing a GraphSLAM optimization, however, other SLAM algorithms may also be used. SLAM algorithms include state estimation algorithms in which a state (localization of traces and characteristics of maps) is determined by maximizing its likelihood. The likelihood comes from a set of constraints, which are indicated by data within the logs of data, or by areas, as described above. Because the state can lie in a space of high dimension (e.g., hundreds of thousands of dimensions), finding a global optimum may be difficult.

Within examples, a SLAM algorithm is executed to build a map within an unknown environment (without a priori knowledge), or to update a map within a known environment (with a priori knowledge from a given map), while at the same time maintaining a record of a current location of the device. The device may maintain odometry measurements, and as odometry changes due to movement of the device, uncertainty pertaining to a new position of the device is updated. Landmarks can be extracted from a map of the environment for the new position of the device, and an association between these landmarks to observations of landmarks previously seen can be made. Re-observed landmarks are then used to update the position of the device. Landmarks that have not previously been seen are added as new observations for later processing.

GraphSLAM uses a nonlinear least squares solver designed to find local optimum of a state of the device. It may find the global optimum if a state initialization was close enough to it.

An example non-linear optimization may include Ceres, which is an open source public project. Any non-linear optimization algorithm is possible though. Within examples, the non-linear optimization adjusts an estimate of state parameters (device positions) to better match observations of data (GPS, WiFi scans, gyroscope measured orientation change, accelerometer measured steps, relative position estimates of the device based on dead reckoning). The optimization reduces a "square error" by modifying the state estimate a little at a time until the estimate results in a square error that can no longer be reduced or is within acceptable threshold limits. Thus, the non-linear optimization can be performed to determine possible locations of the device using the constraints as determined from areas (which may be binary constraints or continuous constraints when the area has no defined boundary), and reducing a square error between the possible locations of the device.

The first SLAM optimization including the first stage of the method 520 that provides initial location estimates of the device can be processed with estimated relative locations from dead reckoning during a second stage of the method 520. Thus, the first stage may be executed to output a close approximation of location of the device in a fast manner (due to low amounts of processing), and dead reckoning or odometry information may be added in the processing of the second stage for more accurate positioning.

Figure 8:
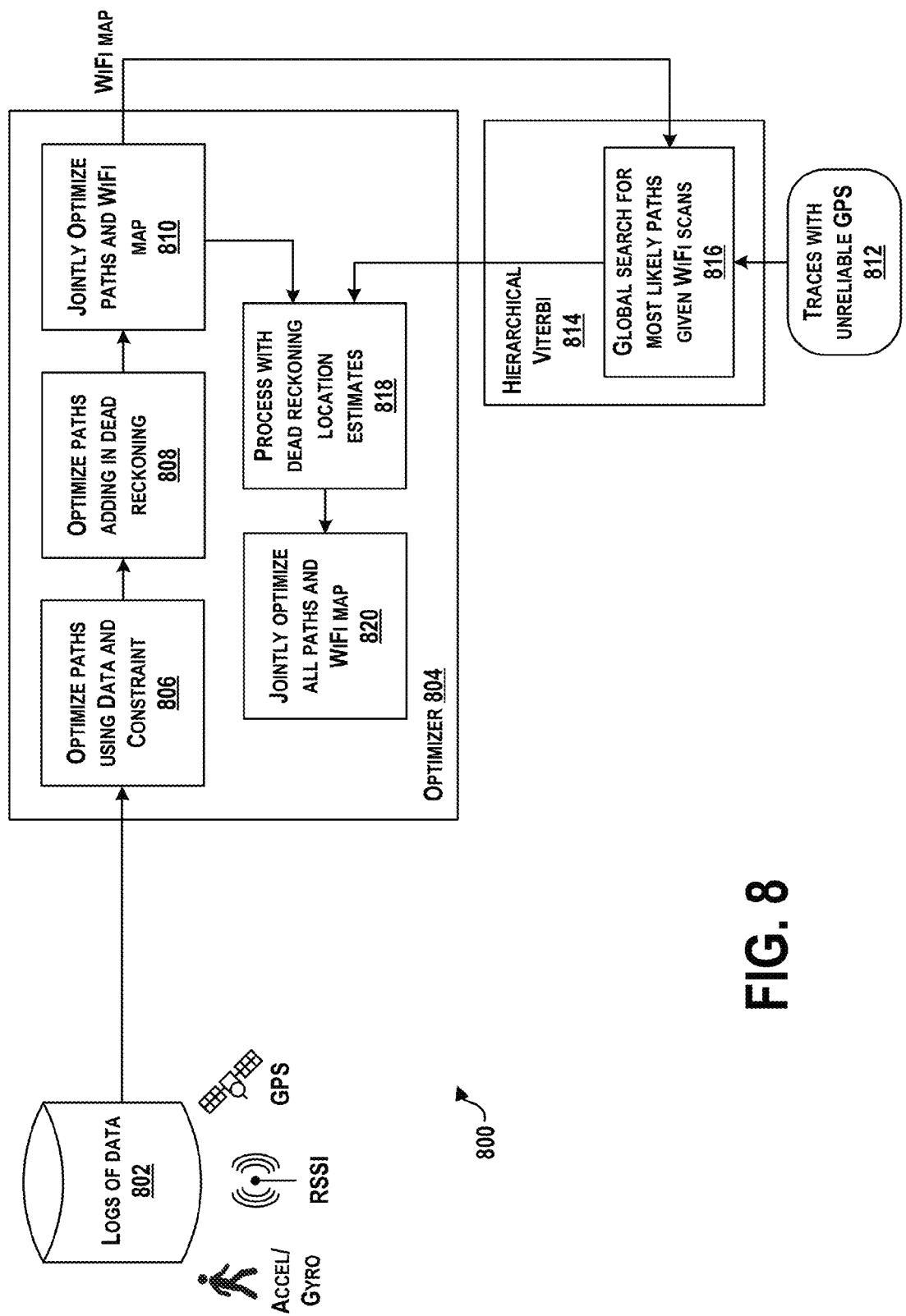
FIG. 8 is a block diagram that conceptually illustrates an example system for determining location estimates of a device, and optionally, maps of observed data received from the device.

FIG. 8 is a block diagram that conceptually illustrates an example system 800 for determining location estimates of a device, and optionally, maps of observed data received from the device. Any of the blocks in the system 800 may be representative of modules, processors, or other devices, or may take the form of instructions executable by processors to perform the associated function. In the system 800, logs of data 802 are received from devices. The logs of data include GPS, RSSI, accelerometer, and gyroscope data with associated timestamps as collected by respective devices.

The logs of data may be provided to an optimizer 804, for example. The optimizer 804 may optimize paths using the data and constraints, as shown at block 806. Constraints are based on data that is received and may be boundaries or bounded areas in which the device is estimated to be located due to a received wireless signal strength, for example. Next, the optimizer may optimize paths adding in dead reckoning, as shown at block 808. As described above, using for example a ceres optimizer, optimal maps (e.g., of WiFi signal strength) can be generated to jointly optimize paths and maps using a SLAM optimization and output a map, as shown at block 810.

Additional data can be received and used to further modify maps. For example, traces from devices with unreliable data (at block 812) may be received at a hierarchical Viterbi processor 814 to perform a global search for most likely paths given associated WiFi scans in the traces, as shown at block 816. As an example, a path of a user trace may be determined using the Viterbi algorithm (e.g., most likely path through a graph) based on one or more of motion probabilities from dead reckoning, transition probabilities from floorplan, or emission probabilities from a WiFi model. The optimizer 804 may receive the output of the global search and process with the dead reckoning, as shown at block 818, and jointly optimize all paths and WiFi maps using a SLAM optimization, as shown at block 820.

The SLAM optimization can be performed iteratively on growing subsets of states and constraints to determine a location of a device when data was collected based on all data collected. A first iteration uses subsets so that a function minimized is convex. Running SLAM on these subsets gives an estimate of the state subset. This estimate is used for determining the next subsets to include and the initialization to use for the next iteration. Thus, more constraints are added using a previous determination as a time starting point as the best prediction. The system 800 defines a process that selects states, optimizes the states using a non-linear least squares solver, and runs SLAM algorithms to determine how to initialize the state for the next optimization iteration.

Although examples are described as determining a WiFi signal strength map, similar or same functions may be performed to determine localization of passively collected traces for creation of other types of maps, such as magnetometer maps.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving logs of data, wherein respective data is collected by a device over a plurality of locations and over a time period;
    determining first location estimates of the device according to a comparison of data available in the logs of data with available known signal strength maps of corresponding data, wherein the first location estimates indicate a trajectory of the device over the time period;
    determining, by one or more processors, second location estimates of the device using the first location estimates and relative position estimates of the device based on dead reckoning, wherein the relative position estimates of the device based on dead reckoning link together data points within the first location estimates considered to be consecutive location estimates of the device, wherein the second location estimates indicate a refined trajectory of the device over the time period;
    determining output location estimates of the device using the second location estimates, the relative position estimates based on dead reckoning, and the respective data, wherein the output location estimates indicate a further refined trajectory of the device over the time period; and
    generating maps of the plurality of locations based on the output location estimates of the device and the logs of data, wherein the maps include one or more of a map of WiFi received signal strength indications (RSSI), a map of magnetic fields, a geographical map of pathways, and a map of GPS visibility.

2. The method of claim 1, wherein the logs of data include one or more of information indicative of received signal strength for a wireless network at a given location and at a given time period, GPS positioning data, magnetic field data, accelerometer data, and gyroscope data.

3. The method of claim 1, wherein determining the first location estimates comprises:
    based on the logs of data, determining possible locations of the device for instances when a wireless network signal has been observed from a wireless network;
    comparing the wireless network signal to a map of wireless signal strength for the wireless network;
    determining a measurement probability map in which a given wireless signal strength corresponds to a signal strength of the wireless network signal; and
    using the measurement probability map to determine the first location estimates of the device.

4. The method of claim 3, wherein determining the measurement probability map in which the given wireless signal strength corresponds to the signal strength of the wireless network signal comprises:
    determining a first radius indicating a first distance away from an access point in the wireless network for which the signal strength is associated;
    determining a second radius indicating a second distance away from the access point in the wireless network for which the signal strength is associated; and
    determining the measurement probability map to have a first perimeter defined by the first radius and a second perimeter defined by the second radius.

5. The method of claim 1, wherein determining the first location estimates for locations of the device comprises:
    based on the logs of data, determining by the one or more processors possible locations of the device for instances when a Bluetooth wireless signal has been observed;
    comparing the Bluetooth wireless signal to a map of Bluetooth devices;
    determining a measurement probability map in which a given Bluetooth wireless signal is estimated to be received; and
    using the measurement probability map to determine the first location estimates of the device.

6. The method of claim 1, wherein determining the first location estimates for locations of the device comprises:
    based on the logs of data, determining by the one or more processors possible locations of the device for instances when a magnetic field signal has been collected;
    comparing the magnetic field signal to a map of magnetic field signal strength for a given location of the plurality of locations;
    determining a measurement probability map in which a given magnetic field signal strength corresponds to a signal strength of the magnetic field signal; and
    using the measurement probability map to determine the first location estimates of the device.

7. The method of claim 1, wherein determining one or more of the first location estimates, the second location estimates, and the output location estimates comprises performing a simultaneous localization and mapping (SLAM) optimization.

8. The method of claim 7, wherein performing the SLAM optimization comprises performing a GraphSLAM optimization.

9. The method of claim 1, wherein determining the first location estimates comprises performing a simultaneous localization and mapping (SLAM) optimization of location estimates of the device using the logs of data without using given relative position estimates of the device based on dead reckoning.

10. The method of claim 9, wherein performing the SLAM optimization of location estimates of the device comprises using an artificial area in the map where the respective data is estimated to be collected, and the method further comprises:
    performing one or more additional SLAM optimizations using the output location estimates, the relative position estimates of the device based on dead reckoning, and replacing the artificial area with the respective data.

11. A non-transitory computer readable memory having stored therein instructions, that when executed by one or more processors, cause the one or more processors to perform functions comprising:
    receiving logs of data, wherein respective data is collected by a device over a plurality of locations and over a time period;

determining a constraint for locations of the device according to a comparison of data available in the logs of data with available known signal strength maps of corresponding data;

performing a first simultaneous localization and mapping (SLAM) optimization of location estimates of the device using the logs of data and the constraint as a first initialization;

based on the first SLAM optimization, providing a first location estimate of the device over the time period, wherein the first location estimate indicates a trajectory of the device over the time period;

performing a second SLAM optimization of the location estimates of the device using the first location estimate and relative position estimates of the device based on dead reckoning as a second initialization;

based on the second SLAM optimization, providing an output location estimate of the device over the time period; and generating maps of the plurality of locations based on the output location estimate of the device and the logs of data, wherein the maps include one or more of a map of WiFi received signal strength indications (RSSI), a map of magnetic fields, a geographical map of pathways, and a map of GPS visibility.

12. The non-transitory computer readable memory of claim 11, wherein determining the constraint for locations of the device comprises:

based on the logs of data, determining by the one or more processors possible locations of the device for instances when a wireless network signal has been observed from a wireless network;

comparing the wireless network signal to a map of wireless signal strength for the wireless network;

determining a measurement probability map in which a given wireless signal strength corresponds to a signal strength of the wireless network signal; and using the measurement probability map as the constraint for locations of the device.

13. The non-transitory computer readable memory of claim 11, wherein determining the constraint for locations of the device comprises:

based on the logs of data, determining by the one or more processors possible locations of the device for instances when a Bluetooth wireless signal has been observed;

comparing the Bluetooth wireless signal to a map of Bluetooth devices;

determining a measurement probability map in which a given Bluetooth wireless signal is estimated to be received; and using the measurement probability map as the constraint for locations of the device.

14. The non-transitory computer readable memory of claim 11, wherein determining by one or more processors the constraint for locations of the device comprises:

based on the logs of data, determining by the one or more processors possible locations of the device for instances when a magnetic field signal has been collected;

comparing the magnetic field signal to a map of magnetic field signal strength for a given location of the plurality of locations;

determining a measurement probability map in which a given magnetic field signal strength corresponds to a signal strength of the magnetic field signal; and using the measurement probability map as the constraint for locations of the device.

15. A system comprising:
one or more processors; and
data storage configured to store instructions that, when executed by the one or more processors, cause the system to perform functions comprising:

receiving logs of data, wherein respective data is collected by a device over a plurality of locations and over a time period;

determining a constraint for locations of the device according to a comparison of data available in the logs of data with available known signal strength maps of corresponding data;

performing a first simultaneous localization and mapping (SLAM) optimization of location estimates of the device using the logs of data and the constraint as a first initialization;

based on the first SLAM optimization, providing a first location estimate of the device over the time period, wherein the first location estimate indicates a trajectory of the device over the time period;

performing a second SLAM optimization of the location estimates of the device using the first location estimate and relative position estimates of the device based on dead reckoning as a second initialization; and based on the second SLAM optimization, providing an output location estimate of the device over the time period; and generating maps of the plurality of locations based on the output location estimate of the device and the logs of data, wherein the maps include one or more of a map of WiFi received signal strength indications (RSSI), a map of magnetic fields, a geographical map of pathways, and a map of GPS visibility.

16. The system of claim 15, wherein performing the first SLAM optimization of location estimates of the device using the logs of data and the constraint as the first initialization comprises using an artificial area in the map where the respective data is estimated to be collected as the constraint, and the method functions further comprise:

performing one or more additional SLAM optimizations using the output location estimate, the relative position estimates of the device based on dead reckoning, and replacing the artificial area with the respective data.

17. The system of claim 15, wherein determining the constraint for locations of the device comprises:

based on the logs of data, determining by the one or more processors possible locations of the device for instances when a wireless network signal has been observed from a wireless network;

comparing the wireless network signal to a map of wireless signal strength for the wireless network;

determining a first measurement probability map in which a given wireless signal strength corresponds to a signal strength of the wireless network signal;

based on the logs of data, determining by the one or more processors additional possible locations of the device for instances when a Bluetooth wireless signal has been observed;

comparing the Bluetooth wireless signal to a map of Bluetooth devices;

determining a second measurement probability map in which a given Bluetooth wireless signal is estimated to be received;

determining a geographic intersection of the first measurement probability map and the second measurement probability map; and using the geographic intersection as the constraint for locations of the device.

18. The system of claim 15, wherein determining the constraint for locations of the device comprises:
- based on the logs of data, determining by the one or more processors possible locations of the device for one or more instances when (i) a wireless network signal has been observed from a wireless network, (ii) a Bluetooth wireless signal has been observed, or (iii) a magnetic field signal has been collected;
- based on presence of a given signal in the logs of data, comparing (i) the wireless network signal to a map of wireless signal strength for the wireless network, (ii) the Bluetooth wireless signal to a map of Bluetooth devices, and (iii) the magnetic field signal to a map of magnetic field signal strength for a given location of the plurality of locations;
- determining a first measurement probability map in which a given wireless signal strength corresponds to a signal strength of the wireless network signal;
- determining a second measurement probability map in which a given Bluetooth wireless signal is estimated to be received;
- determining a third measurement probability map in which a given magnetic field signal strength corresponds to a signal strength of the magnetic field signal; and
- determining a geographic intersection of the first measurement probability map, the second measurement probability map, and the third measurement probability map; and
- using the geographic intersection as the constraint for locations of the device.

* * * * *